Figure 1:
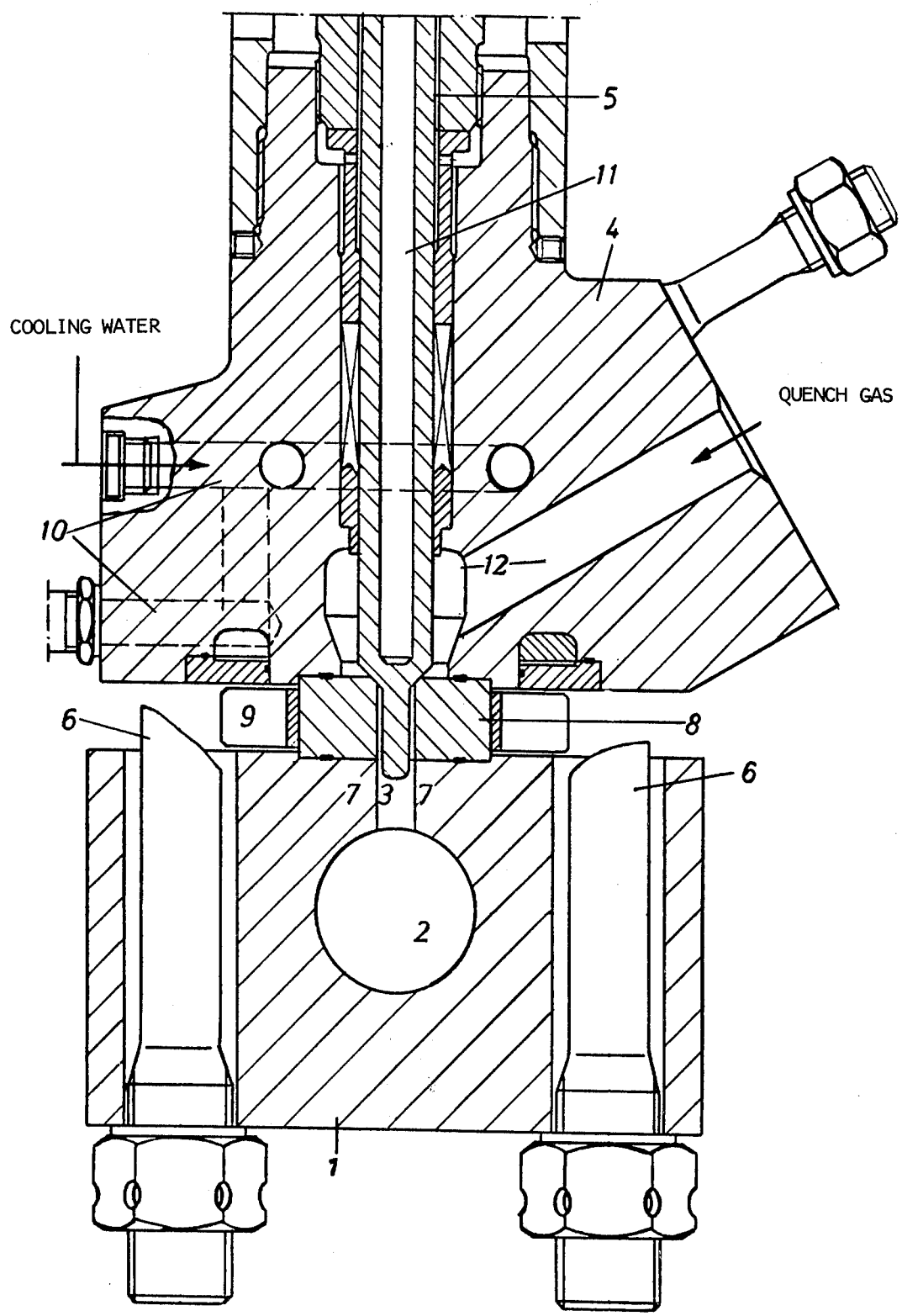

United States Patent [19]

Korner et al.

[11] 4,147,517

[45] Apr. 3, 1979

[54] THREE-WAY-VALVE

[75] Inventors: Jörg-Peter Körner, Hagen; Josef Stalzer; Günther Dornhoff, both of Hagen-Emst; Manfred Köpl, Hagen, all of Fed. Rep. of Germany

[73] Assignee: Uhde, GmbH, Dortmund, Fed. Rep. of Germany

[21] Appl. No.: 785,548

[22] Filed: Apr. 7, 1977

[30] Foreign Application Priority Data

Apr. 7, 1976 [DE] Fed. Rep. of Germany ....... 2615027

[51] Int. Cl.² .............................................. B01J 3/04
[52] U.S. Cl. ................................. 422/242; 251/146; 251/361; 251/367; 422/310
[58] Field of Search ............... 251/146, 145, 361, 367; 137/322, 338; 23/252 R, 290

[56] References Cited
U.S. PATENT DOCUMENTS

| 627,103 | 6/1899 | Curtis | 251/361 |
|---|---|---|---|
| 1,016,725 | 2/1912 | Adams | 137/338 |
| 1,172,298 | 2/1916 | Morris | 251/145 |
| 1,707,630 | 4/1929 | Erceg | 251/361 |
| 1,890,654 | 12/1932 | Myers | 23/290 |
| 2,486,124 | 10/1949 | Crockett | 137/338 |
| 3,503,416 | 3/1970 | Clarkson | 251/146 |
| 3,503,713 | 3/1970 | Hansel | 251/146 |
| 3,591,132 | 7/1971 | Johnston | 251/146 |
| 3,701,634 | 10/1972 | Worden | 23/290 |

FOREIGN PATENT DOCUMENTS

| 923762 | 1/1955 | Fed. Rep. of Germany | 251/146 |
|---|---|---|---|
| 1111468 | 7/1961 | Fed. Rep. of Germany | 251/145 |
| 2350783 | 4/1975 | Fed. Rep. of Germany | 137/322 |
| 1106554 | 12/1955 | France | 251/146 |

Primary Examiner—William R. Cline
Assistant Examiner—H. Jay Spiegel
Attorney, Agent, or Firm—Malcolm W. Fraser

[57] ABSTRACT

Valve for use with a tubular chemical reactor operating at pressures of over 1000 bar and temperatures of more than 250° C. The actual wall thickness of the lower valve part within the area of the inlet/outlet duct is at least 35% less than the wall thickness of adjacent wall areas, the undersize being compensated by the prestress applied by the tightening bolts of the upper valve part. A lens type seal is located between the lower valve part and the upper valve part and simultaneously (1) seals the connection between the valve parts and (2) comprises the valve seat. The thermal conductivity of the seal is at least 50% lower than that of the valve material.

3 Claims, 4 Drawing Figures

FIG. I

THREE-WAY-VALVE

The invention refers to a three-way valve with a free passage for two ways and one inlet or outlet duct capable of being shut off, the lower part of the valve with the free passage being a reactor segment suited for operating pressures of over 1,000 bar and for operating temperatures of more than 250° C.

Three-way valves of the type mentioned, especially when employed as reactor segments, are built into the tubular reactor in such a manner that the free passage forms part of the tubular reactor. To control the reaction, either quench gas is fed or reaction gas is withdrawn via the inlet or outlet duct that can be shut off.

As a rule, tubular reactors are of considerable length and will, therefore, be provided with several three-way valves distributed over the entire length of the tubular reactor.

In the case of such tubular reactors, it is necessary for the temperature of the quench gas upstream of the valve to remain low when the three-way valve is closed, i.e. the quench gas temperature must not be raised by the reaction heat inside the tubular reactor segment; at the same time, the dead space between the sealing edge on the valve seat and plug and the reactor passage must be as small as possible when the valve is closed.

Various designs are known that meet this requirement. The thick outer walls of the upper valve part, for instance, are provided with intercommunicating cooling ducts which are connected to a coolant cycle.

As a result, most of the undesired heat transmitted from the tubular reactor to the upper valve part via the lens type sealing element is dissipated before it can heat up the quench gas above the valve stem.

However, the cooling ducts cannot be arranged at too close a distance from the valve part for the quench gas, since this would weaken the pressure-bearing walls while a certain wall thickness would remain, thus causing undesired heat to be transmitted and, consequently, such a design is insufficient.

A further known measure for the dissipation of undesired heat that has already been transferred to the upper valve part and to the valve stem is the thermosiphon cooling of the stem in its vertical position. The stem has a bore which is closed at the top and which may be of differing diameters in order to ensure that the tapered stem end is also cooled, the bore being filled with water or a similar coolant up to two thirds of its length. In view of the fact that the stem is heated most at its lower end, the liquid contained in that part will also be heated most. This liquid will rise, cool down, and circulate downwards again. Cooling fins on the upper part of the stem will increase the temperature gradient and thus the heat that can be dissipated. Thermosiphon cooling can be applied only with the valve stem being vertical, as otherwise a reduced circulation of the coolant will result.

These well-known measures are intended to dissipate the heat that has already passed into the upper valve part without causing any harm. However, since the constructional means are locally limited and as a minimum wall thickness for the limitation of the gas ducts must be maintained owing to the high operating pressures, there are still some zones of material that become unduly hot. As a result, the quench gas upstream of the closed valve may heat up and undesired gas reactions inside the quench gas duct will occur.

The aim of the invention is to restrict the dead space of the inlet or outlet duct inside the three-way valve and to prevent the quench gas upstream of the valve from being heated.

According to the invention, the three-way valve is designed such that the actual wall thickness of the lower valve part within the area of the inlet or outlet duct is at least 35% less than the theoretical wall thickness, the undersize being compensated by the prestress applied by means of the tightening bolts of the upper valve part, the lens type seal located between the lower and the upper valve part simultaneously constituting the valve seat, and the lens type seal being made of a material, the thermal conductivity of which is, at least, 50% inferior to that of the valve material.

According to a further embodiment of the invention, the outer surface of the lens type seal is provided with cooling fins having a thermal conductivity superior to that of the valve material.

In the event that the reactions taking place inside the tubular reactor are highly exothermic and if this results in elevated temperatures prevailing inside the tubular reactor and, consequently, inside the lower valve part as well, as a result of which there may be a risk of considerable heat being transferred towards the upper valve part, the lens type seal will consist of at least two sandwiched metal plates that are tightly joined at their outer rims and which have at least one disc-shaped cavity inside.

The technical progress achieved by this invention consists in the fact that the dead space towards the valve stem is substantially reduced and that the heat transmitted from the lower valve part, which is simultaneously a segment of the tubular reactor, towards the upper valve part is considerably decreased.

The valve seat is shifted towards the reaction chamber, and the heat transfer to the upper valve part is diminished by the lens type seal with its reduced thermal conductivity to such an extent that the local cooling effect obtained by the cooling ducts and by thermosiphon cooling inside the valve stem will be sufficient. The lens type seal thus acts as a barrier to heat dissipation.

If the lens type seal is additionally provided with cooling fins or with an internal disc-shaped cavity, i.e. sandwiched, a further reduction of heat transfer can be obtained. For a cavity depth of 1 mm and an area of about 50% of the total surface area of the lens type seal, for example, the calculated further reduction of the heat transfer will be 50%.

With the lens type seal according to the invention, the temperature gradient that can be attained in the upper part of the valve is such that, even in the case of reactors working at reaction temperatures of over 300° C., the temperature will not reach 150° C. at any point of the valve upper part. Thus it will definitely be possible to avoid any undesired polymerization of the quench gas inside the closed valve.

An example of the invention is shown in the drawing and will be described in detail below.

Figure 2:
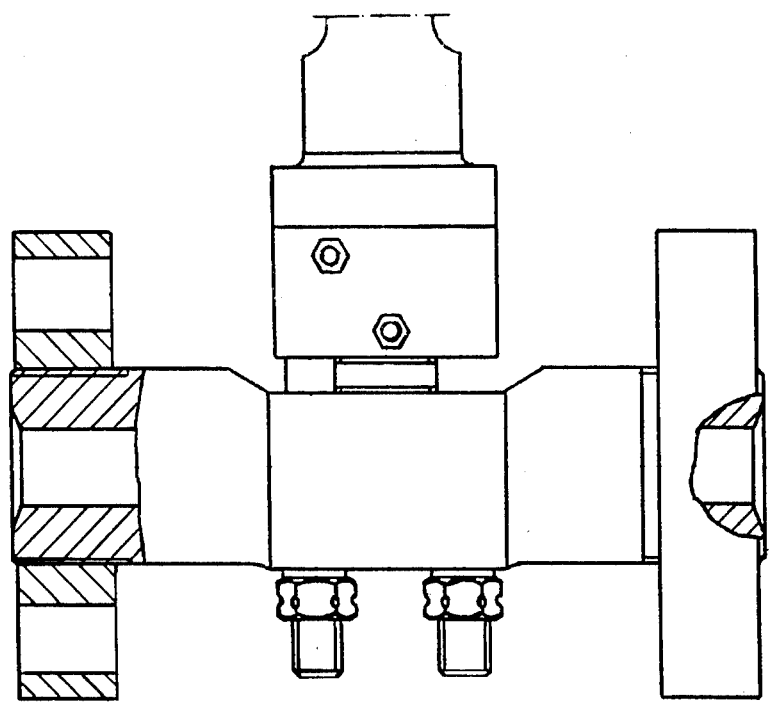
Figure 3:
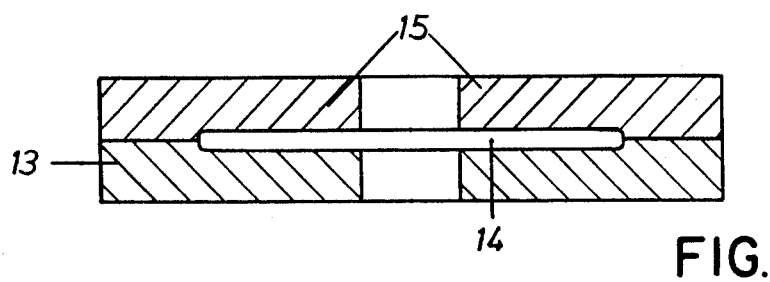
Figure 4:
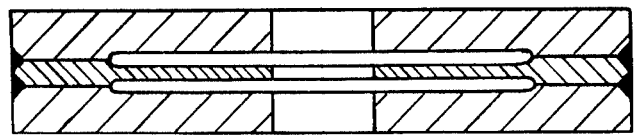

The drawings illustrate:
FIG. 1: A three-way valve.
FIG. 2: Side view of a three-way valve.
FIG. 3: A sandwiched lens type seal.
FIG. 4: A multi-sandwiched lens type seal.

According to FIG. 1, the lower part of the three-way valve (1) with the reaction space (2) has an inlet/outlet duct (3) for the supply of quench gas and for the discharge of reaction gas. The reaction inside the tubular reactor and, consequently, the reactor temperature are controlled by means of the quench gas. The upper valve part (4) with the stem (5) is fastened to the lower valve part by the tightening bolts (6). The actual wall thickness of the lower valve part (1) in the area (7) of the inlet/outlet duct (3) below the lens type seal (8) is at least 35% less than the design wall thickness. The lens type seal (8) located between the lower valve part (1) and the upper valve part (4) is installed in such a way that it can simultaneously serve as a valve seat. For the purpose of heat dissipation, the lens type seal is additionally provided with cooling fins made of a material that has a higher thermal conductivity than the material of the lens type seal. The temperature of the upper valve part (4) with its cooling ducts (10) and the stem (5) with the bore (11) for thermosiphon cooling is only raised slightly, so that the space (12) for the pressurized quench gas remains relatively cool.

FIG. 2 shows the wall thickness reduction of the lower valve part in the area of the inlet/outlet duct.

The sandwiched lens type seal (13) as represented in FIG. 3 has a cavity (14) in its internal zone (15), the cavity being the characteristic feature according to the invention. The lens type seal may consist of one single piece or of two or several sandwiched discs, as illustrated in FIG. 4, the discs being tightly joined on their periphery and, consequently, do not touch on the inside.

The valve according to the invention is also used as a safety valve. As a result of the diminished dead space inside the inlet/outlet duct, side reactions are extremely unlikely.

We claim:

1. Three-way valve assembly for reactors comprising
   a. a lower valve body having a longitudinal duct providing a chemical reaction space and connected at its ends to reactor elements respectively for working pressures over 1000 bar and for operating temperatures of more than 250° C.,
   b. an upper valve part provided with an inlet/outlet duct transverse to and communicating with an intermediate portion of said longitudinal duct,
   c. a shiftable valve in said upper valve part,
   d. a lens type seal between said upper and lower valve parts, and providing a valve seat adapted to be covered and uncovered by said valve,
   e. said lens type seal being of a material having a thermal conductivity at least 50% lower than that of the valve material,
   f. the wall thickness of the lower valve part in the region of the lens type seal being at least 35% less than wall thickness of the adjacent valve part wall areas on either side thereof, and
   g. fasteners connecting the upper and lower valve parts in the area of the reduced wall thickness of said lower valve part thereby securely to tighten the valve parts.

2. Three-way valve according to claim 1, characterized in that the outer surface of the lens type seal (8) is provided with cooling fins (9), the thermal conductivity of which is higher than that of the valve material.

3. Three-way valve according to claim 1, characterized in that the lens type seal (13) consists of at least two sandwiched metal discs, the discs being tightly joined at their outer rims and having at least one disc-shaped cavity (14) in the internal zone (15) of the lens type seal.